US009962857B2

(12) United States Patent
Peinado (10) Patent No.: US 9,962,857 B2
(45) Date of Patent: May 8, 2018

(54) OFF-SHORE PREPARATION SYSTEM (71) Applicant: MEEDL68 LP, Las Vegas, NV (US)

(72) Inventor: Rene E. Peinado, Wilmington, DE (US)

(73) Assignee: MEEDL68, LP, Las Vegas, NV (US)

(*) Notice: Subject to any disclaimer, the term of this patent is extended or adjusted under 35 U.S.C. 154(b) by 569 days.

(21) Appl. No.: 14/303,274

(22) Filed: Jun. 12, 2014

(65) Prior Publication Data
US 2014/0369154 A1    Dec. 18, 2014

Related U.S. Application Data (60) Provisional application No. 61/834,323, filed on Jun. 12, 2013.

(51) Int. Cl.
| B28C 9/04 | (2006.01) |
| B28C 5/00 | (2006.01) |
| B28C 7/16 | (2006.01) |
| E02D 15/06 | (2006.01) |
| B63B 27/25 | (2006.01) |

(52) U.S. Cl.
CPC ............ B28C 9/0454 (2013.01); B28C 7/165 (2013.01); B63B 27/25 (2013.01); E02D 15/06 (2013.01)

(58) Field of Classification Search
CPC  B29C 9/0454; E02B 7/08; B28C 5/42; B28C 7/0084; B28C 7/161; B28C 7/165; B65G 53/04; B65G 53/32; B65G 53/54; B63B 27/34; C04B 18/049; F16L 11/04; E02F 9/062
USPC .......................................................... 366/51
See application file for complete search history.

(56) References Cited

U.S. PATENT DOCUMENTS

| 2,979,913 A | 4/1961 | Bouvier et al. |
| 3,354,659 A | 11/1967 | Lehmann |
| 3,861,157 A | 1/1975 | Hillen |
| 4,129,008 A | 12/1978 | Nakahara et al. |

(Continued)

FOREIGN PATENT DOCUMENTS

| CN | 101628611 A * | 1/2010 |
| JP | H08207163 A | 8/1996 |

(Continued)

OTHER PUBLICATIONS

Tremie Pipe [datasheet]. Geothermal Supplies, Jun. 2011 [retrieved online] URL: www.geothermansupplies.co.uk.

(Continued)

*Primary Examiner* — Tony G Soohoo
*Assistant Examiner* — Elizabeth Insler
(74) *Attorney, Agent, or Firm* — Mossman, Kumar & Tyler, PC (57) ABSTRACT A waterborne facility on a body of water includes a primary spoolable pipe and a pump. The end of the primary spoolable pipe may be guided from the waterborne facility to a location proximate to a selected site. The pump may be used to discharge a flowable material through the primary spoolable pipe. The waterborne facility may include a ready-mix concrete preparation system. However, the waterborne facility may deliver any flowable material to a selected site, which may be a land surface, underground, on a water surface, or underwater. Illustrative flowable materials include seawater, grout, cement, and sediment/mud.

14 Claims, 5 Drawing Sheets (56) References Cited

U.S. PATENT DOCUMENTS

| | | | | |
|---|---|---|---|---|
| 4,266,889 | A * | 5/1981 | Rail | E02D 15/06 |
| | | | | 405/223 |
| 4,501,446 | A * | 2/1985 | Glaser | B01D 36/00 |
| | | | | 209/10 |
| 4,583,882 | A | 4/1986 | Szabo | |
| 4,643,617 | A | 2/1987 | Kanno et al. | |
| 4,696,607 | A * | 9/1987 | Ressi di Cervia | E02D 5/18 |
| | | | | 37/310 |
| 6,488,088 | B1 * | 12/2002 | Kohli | B28C 5/4231 |
| | | | | 166/285 |
| 2004/0264292 | A1 * | 12/2004 | Harris | B28C 7/0486 |
| | | | | 366/14 |
| 2006/0000515 | A1 * | 1/2006 | Huffman | F16L 11/133 |
| | | | | 138/114 |
| 2011/0146797 | A1 * | 6/2011 | Tan | E21B 17/015 |
| | | | | 137/1 |
| 2012/0198733 | A1 * | 8/2012 | Winkelman | B63B 35/303 |
| | | | | 37/317 |

FOREIGN PATENT DOCUMENTS

| | | |
|---|---|---|
| JP | 2001269925 A | 10/2001 |
| WO | 2011162545 A2 | 12/2011 |

OTHER PUBLICATIONS

Yao, Se. Underwater Concrete Technologies in Marine Construction Projects. Jul. 20, 2010; URL: https://web.archive.org/web/20100720014615/http://www.ce.berkely.edu/~paulmont/165/tremie.pdf.

PCT/US2014/42151—International Search Report dated Oct. 24, 2014.

EP Application No. 14810356.7—Search Report dated Mar. 22, 2017.

EP Application No. 14810356.7—Search Report dated Jul. 12, 2017.

* cited by examiner

OFF-SHORE PREPARATION SYSTEM

CROSS-REFERENCE TO RELATED APPLICATIONS

This applications claims priority from U.S. Provisional Application Ser. No. 61/834,323, filed Jun. 12, 2013, the entire disclosure of which is incorporated herein by reference.

TECHNICAL FIELD

This invention relates generally to the flowable material delivery field, and more specifically to a new and useful system and method of delivering flowable materials via waterborne facilities and watercrafts.

BACKGROUND

Conventionally, concrete is transported from a batching plant to a pour site using vehicle-mounted transit mixers. However, many shoreline or off-shore pour sites are difficult to access by standard truck delivery. Conventional solutions that seek to resolve this issue, particularly those that seek to manufacture concrete off-shore for on-shore use, suffer from long-range transportation problems. As these job sites typically lack docks, any production plant must be located a given distance off-shore. However, transportation of concrete across this distance requires time, during which the concrete cures and reduces in workability. Furthermore, conventional transport methods, such as use of crane-operated buckets, typically expose the concrete to uncontrolled amounts of air or seawater during transit, which can result in uncontrolled concrete property changes.

Furthermore, component durability and storage drawbacks preclude the concrete from being pumped to the shore. Flexible pipes and hoses, such as those made from rubber, cannot support the pressures required to move the product such a long range. Furthermore, the coarse granular composition of the concrete reduces durability and lifetime of these pipes and hoses. The granular concrete composition also reduces the lifetime of most pumps capable of providing pressures sufficient to move the concrete the desired distance. Rigid piping solutions are non-ideal for off-shore production plants, as off-shore production plants are typically limited in storage space.

Furthermore, conventional concrete production and delivery is costly due to the multiple transportation steps that are required before the concrete arrives at the job site. Constituent materials of the concrete, such as aggregate, cement, and admixture, are typically shipped in on supply vessels or via railway, off-loaded onto trucks at the shoreline, transported to an inland production plant, mixed, and transported back to the shoreline via truck. These steps increase the cost of production, increase the lead time between supply vessel arrival at the shoreline and concrete delivery to the shoreline job site, and generate massive amounts of transportation waste products.

Thus, there is a need in the concrete manufacturing and delivery field to create a new and useful concrete production and delivery system. The present disclosure addresses these and other needs of the prior art.

SUMMARY OF THE DISCLOSURE

In aspects, the present disclosure provides a method of delivering a ready-mix concrete to a pour site. The method may include the step of positioning a waterborne facility on a body of water. The waterborne facility may include a spoolable pipe wound on a spool. The method may include the further steps of guiding an outlet end of a spoolable pipe from the waterborne facility to a location proximate to the pour site, preparing the ready-mix concrete at the waterborne facility, and conveying the ready-mix concrete to the pour site via the spoolable pipe.

In embodiments, the method may also include positioning a pump and a mixing volume on the waterborne facility. The spoolable pipe may substantially align with a water's surface, formed primarily of a non-metal, and includes a plurality of layers. The spoolable pipe may include a composite tape layer. By substantially aligned, it is meant that the spoolable pipe is parallel to the water's surface.

The ready-mix concrete may be formed using a plurality of components at least one of which is one of: (i) sand, (ii) gravel, (iii) crushed stone, and (iv) cement. Also, the ready-mix concrete may be formed using at least an aggregate and cement. The aggregate may make up at least 50% of a total volume of the ready-mix concrete. In aspects, the volume of aggregate may be 60-75% of the total volume.

The method may include transporting the component(s) to the waterborne facility using a watercraft. Also, the waterborne facility may include a transporter. In such variants, the method may include docking the watercraft carrying the component(s) at a side of the waterborne facility, rotating the transporter toward the side of the waterborne facility, and positioning an inlet of the transporter in contact with the component(s).

In variants, the waterborne facility may not be attached to a submerged land mass. By submerged land mass, it is meant the ocean floor, sea bed, or other surface defining the boundary between the body of water and the earth below. In such variants, the method may include dynamically positioning the waterborne facility using a propulsion system associated with the waterborne facility while conveying the ready-mix concrete to the pour site via the spoolable pipe.

In variants, the method may also include displacing the spoolable pipe by one of: (i) pulling the outlet end of the pipe, and (ii) rotating the spool on which the spoolable pipe is wound.

In another aspect, the present disclosure provides a system for delivering a ready-mix concrete to a pour site. The system may include a waterborne facility positioned in a body of water, a ready-mix concrete preparation system located on the waterborne facility, and a spoolable pipe wound on a spool on the waterborne facility and connected to the ready-mix concrete preparation system.

In variants, the ready-mix concrete preparation system may include a mixing volume; and a pump in fluid communication with the mixing volume. The pump pumps the ready-mix from the mixing volume into the spoolable pipe.

Also, the system may include one or more transporters conveying at least one component of the ready-mix into the mixing volume. The transporter(s) may receive the component(s) a storage tank on the waterborne facility and/or an adjacent watercraft. The transporter may be configured to convey at least one component of the plurality of components into the mixing volume and the transporter may be selected from an enclosed auger, a conveyor, and/or a substantially fluidly isolated transporter. In embodiments, the waterborne facility may be a self-powered watercraft, a towed watercraft, a floating offshore platform, and an off-shore platform supported by a seabed.

In still another aspect, the present disclosure provides a method of delivering a flowable material to a selected site.

The selected site may be a land or offshore site. The method may include positioning a waterborne facility on a body of water, guiding an end of a primary spoolable pipe from the waterborne facility to a location proximate to the selected site and discharging the flowable material through the primary spoolable pipe. The primary spoolable pipe may be guided along a water's surface using a tether, a watercraft, or an aircraft.

In one variant, the method may include unspooling a second spoolable pipe disposed on the waterborne facility, positioning an inlet of the second spoolable pipe at a dredging location at a seabed, receiving sediments from the seabed through the second spoolable pipe, and pumping the sediments from the second spoolable pipe to the primary spoolable pipe using a pump.

In another variant, the method may include drawing seawater from a location proximate to the waterborne facility, the seawater being the flowable material. In embodiments, the flowable material may be one of: (i) a grout, (ii) a cement.

It should be understood that examples of certain features of the disclosure have been summarized rather broadly in order that detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE FIGURES

The advantages and further aspects of the disclosure will be readily appreciated by those of ordinary skill in the art as the same becomes better understood by reference to the following detailed description when considered in conjunction with the accompanying drawings in which like reference characters designate like or similar elements throughout the several figures of the drawing and wherein.

DETAILED DESCRIPTION OF THE DISCLOSURE

The following description of the described embodiments of the invention is not intended to limit the invention to these described embodiments, but rather to enable any person skilled in the art to make and use this invention. For brevity and preciseness, the following description uses the certain technical terms. A watercraft refers to any marine vessel that is engineered and constructed to propel itself along a body of water, marine vessel that is engineered to float but does not have onboard equipment for self-propulsion (i.e., an unpowered watercraft), or any marine vessel engineered to be towed or otherwise moved along a body of water. A waterborne facility refers to any watercraft or floating platform that is engineered and constructed to accommodate heavy equipment such as pumps, hydraulically powered spools, conveyance mechanisms and/or structures such as bins or containers. The term "near coastal" refers to a region or zone extending inland from a shoreline. Depending on the geography and terrain, a near coastal location can be a few miles or a dozen miles or more from the shoreline.

Figure 1A:
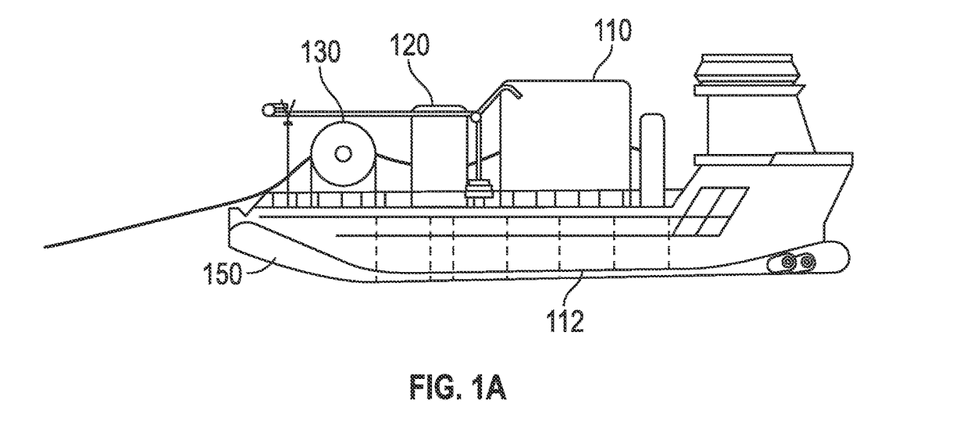
FIGS. 1A and 1B are a side view and a top-down view of a variation of one embodiment of a off-shore preparation system according to the present disclosure, respectively.
Figure 1B:
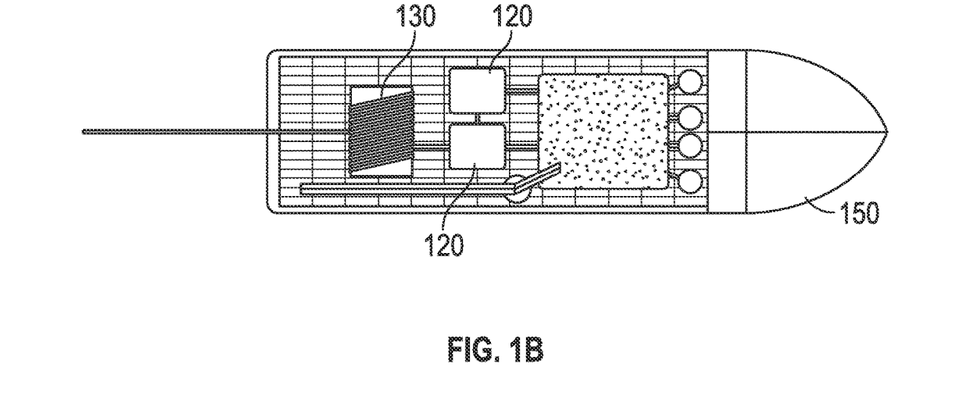

As shown in FIG. 1A, the off-shore preparation system 100 includes a mixing volume 110, reagent storage 112, a displacement mechanism 120, a material transfer mechanism 130, and a vessel 150 supporting the mixing volume. This system functions to prepare and deliver slurry products for construction, such as concrete, grout, and mortar. However, the system can alternatively transport earthworks products (e.g., products from excavation, dredging, etc.), such as sediment, or any other suitable product. This system may be used to provide products (e.g., concrete, grout, mortar, cement, etc.) for shoreline and off-shore developments, but can alternatively be used for any other suitable application. For example, the system can be used to supply specialized grout to be used in soil stabilization such as shoreline erosion and grout for arresting toxic soils from contaminating other areas. The system may be used within a mile of the development site, but can alternatively provide products to the development site from any suitable distance. The system may also be used to provide high volumes of water for firefighting and to dredge waterways.

As discovered by the inventor, this system confers several advantages over conventional systems. First, by arranging the preparation system on a watercraft, this system is able to reach locations otherwise inaccessible to wheeled vehicle transport. Second, this system resolves long-range transportation issues, such as product curing, by utilizing high pressures to move the product from the vessel to the desired site, by maintaining a substantially closed system (e.g., a system that is substantially fluidly isolated from seawater and air), and by adding admixtures that can extend the product curing time. Third, this system resolves the durability and component storage issues experienced by conventional concrete piping systems by utilizing a flexible composite bonded pipe that can be wound in a spool for storage on-board with the ability to sustain high pressures. Fourth, by enabling supply vessels to directly couple to and supply the system with raw materials, this system reduces the number of transportation steps required to produce and deliver the product. In doing so, this system not only reduces waste product emissions, but reduces the operational cost of delivering the product as well.

Figure 2A:
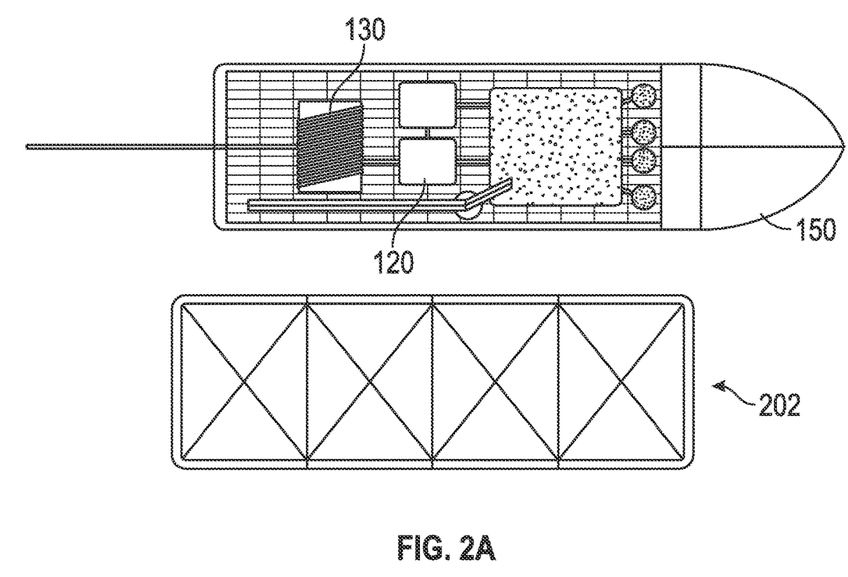
FIGS. 2A and 2B are top-down views of a variation of the off-shore preparation system interfacing with off-vessel reagent storage attached alongside, wherein the reagent transporter is in the retracted mode and the extended mode, respectively.
Figure 2B:
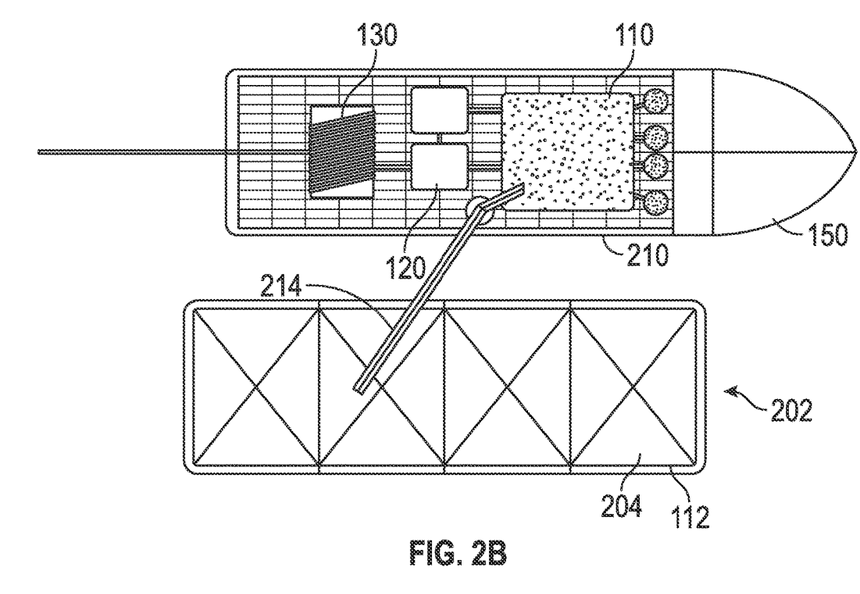

In one example of a method of system operation as shown in FIGS. 2A and 2B, the method includes coupling an auxiliary vessel 202 holding a solid reagent 204 to the vessel 150 (FIG. 2A), feeding the solid reagent 204 from the auxiliary vessel 202 into the product volume 110, feeding stored reagents from the reagent storage 112 to the product volume 110 (FIG. 2B), mixing the reagents within the product volume 110, moving the resultant product through a deployed material transfer mechanism 130 (e.g., pipe) with the displacement mechanism 120 (e.g., high pressure pump), and decoupling the auxiliary vessel 202 when the solid reagent supply on the auxiliary vessel is exhausted. The auxiliary vessel 202 may be coupled to the vessel 150 or retained proximal the vessel by mooring lines, dynamic positioning systems, by conventional propulsion systems, or by any other suitable coupling mechanism 210. The solid reagent 204 is drawn into the product volume 110 by a material transporter 214, such as an enclosed auger and conveyor or other substantially fluidly isolated transporter, but can be otherwise moved into the product volume. The stored reagents are pumped from reagent storage 112 into the product volume 110. When a component of the product is water, the water can be pumped into the product volume 110 from reagent storage 112 or from the surrounding water source (e.g., sea). The auxiliary vessel 202 may be detached from the vessel 150 and exchanged for a second auxiliary vessel holding a volume of the solid reagent when the solid reagent supply 204 of the first auxiliary vessel 202 is exhausted. The auxiliary vessel 202 may be a part of a fleet of vessels that are used to continuously or periodically supply reagents such as aggregate and cement. The stored reagents 204 can be refilled from land or directly from supply vessels when reagent volume held by the reagent storage 206 is exhausted. However, the system can be otherwise operated.

Figure 3A:
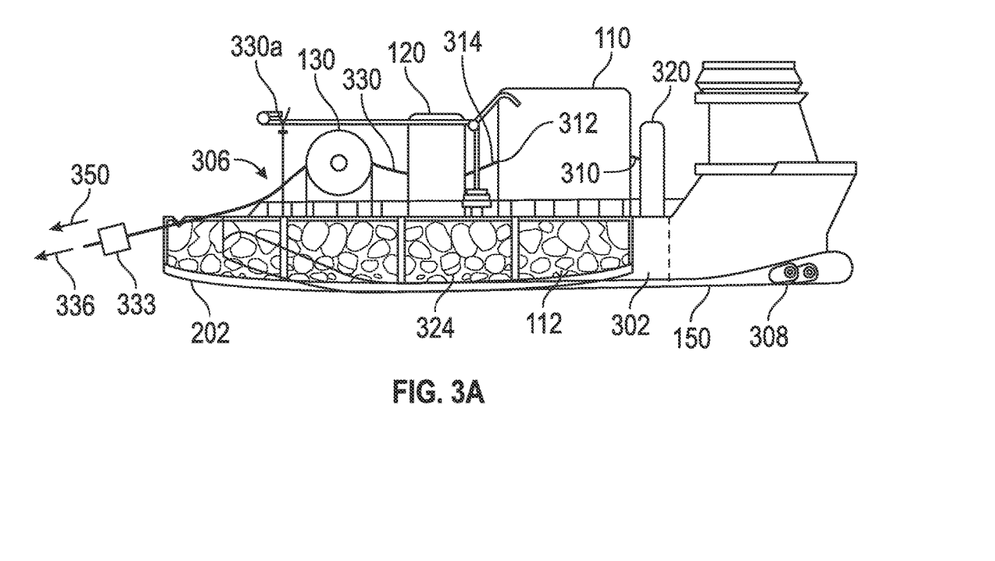
FIGS. 3A and 3B are side views of a variation of the off-shore preparation and delivery system between compartments with the reagent transporter in the retracted mode, the reagent transporter in the extended mode, and the reagent transporter transporting reagent to the vessel.

As shown in FIG. 3A, the vessel 150 of the system functions to support the mixing volume 110, reagent storage 112, displacement mechanism 120, and material transfer mechanism 130. The vessel 150 includes a hull 302 supporting a deck 306 configured to be elevated above water level, a propulsion system 308 that moves the vessel 150, one or more generators or power sources that powers the propulsion system 308 and/or the system components, and a control system that controls vessel operation and/or product production.

Vessel propulsion may be automatically controlled by the control system, but can alternatively be manually controlled or semi-automatically controlled based on a user input. The vessel 150 can additionally include a dynamic positioning system (e.g., sensors and programming) connected to the propulsion system that is capable of substantially maintaining the geographical position of the vessel 150. In that mode of operation, the vessel 150 is not attached to a submerged land mass or attached to a shore-based structure. The vessel 150 may also use conventional propulsion systems to maintain station. In other modes of operation, the vessel can include anchors, mooring lines, or any other suitable position retention mechanism. The vessel 150 can be a ship (e.g., a cargo ship), a barge or other self propelled vessel (e.g., a platform supply vessel), a raft, a tanker, or be any other suitable watercraft. The vessel 150 may be operable between a production mode and an underway mode. The vessel position (e.g., geographic location) may be substantially stationary in the production mode, and the power source provides power to the production system. The vessel position can be retained by anchoring to the seabed, mooring to a stationary structure (e.g., an anchored buoy), through dynamic positioning, or otherwise retained in a selected geographical position.

The transfer mechanism 130 may be extended in the production mode, but can alternatively be retracted and extended in later stages of product delivery. The vessel position may be changing when the vessel 150 is underway, wherein the propulsion systems 308 drive vessel motion. The mixing volume 110 can be in operation (e.g., mixing) while the vessel is underway, or mixing volume operation can be substantially ceased. The transfer mechanism 130 is retracted when the vessel is underway, but can alternatively be dynamically extending or retracting as the vessel moves further or closer to the pour site, respectively.

The mixing volume 110 of the system functions to mix the disparate reagents to produce the product. In one variation, the mixing volume 110 functions as a reactor. The mixing volume 110 may be substantially fluidly sealed, but can alternatively equilibrate to the ambient environment. The mixing volume 110 includes inlets 310 for the reagents and at least one outlet 312 configured to fluidly connect to the transfer mechanism 130 or displacement mechanism 120. The mixing volume 110 may include agitation devices, such as blades, translating surfaces, or any other suitable mixing mechanism. Examples of the mixing volume include a rotary mixing drum, a two-shaft mixer, and a vertical axis mixer, but any other suitable volume capable of retaining a fluid can be used. The system can include one or more mixing volumes. The mixing volume 110 is fluidly connected to the reagent storage 112 by reagent lines, and may be fluidly connected to the displacement mechanism 120 by one or more product lines 314. The mixing volume 110 may be supported on the deck 306, but can be arranged within the vessel hull 302 or in any other suitable portion of the vessel 150. Alternatively, the mixing volume 110 can be a segment of the displacement mechanism 120.

The reagent storage 112 of the system functions to retain reagents 204 (e.g., components or precursors) of the product. The reagent storage 112 may be a container that may be substantially fluidly sealed, but can alternatively be a container that equilibrates with the ambient environment. The reagent storage can include linings or treatments that render the storage container or hull 302 substantially inert to the contained reagent 204. Each reagent storage unit stores a single reagent, but can alternatively store a mixture of reagents. Each reagent storage unit includes one or more outlets configured to fluidly connect to the mixing volume 110, and can additionally include one or more inlets for storage filling. However, the storage can be filled and emptied through the same orifice. Reagent flow rate to the mixing volume 110 may be controlled by the control system, but can alternatively be manually or otherwise controlled. The reagent storage 112 can additionally function to store waste. The waste can be stored in a dedicated reagent storage container, or can be stored in a reagent storage container previously evacuated during product production. The waste may be production waste (e.g., washings, slop, etc.), but can alternatively be any other suitable waste.

As shown in FIG. 3A, the reagent storage 112 can be in-hull 302, on-deck 306, or off vessel (not shown). The system can include one or more types of reagent storage 112. In-hull storage includes containers or containment volumes defined within the hull 302. In-hull storage may be used to store liquid or higher bulk density reagents such as powder, but can alternatively be used to store low bulk density reagents such as aggregate. On-deck storage includes storage containers 320 on deck 306. The on-deck storage containers are removably fixed to the deck 306 (e.g., tied down, mounted, bolted, welded etc.), but can alternatively be otherwise coupled to the deck. The on-deck storage stores reagents for which a gravitational force can benefit reagent pumping (e.g., by leveraging gravity feeding), or the reagents that require the most energy to move from storage. Such reagents include viscous reagents, such as cement (e.g. Portland cement). However, any other suitable reagent can be stored in on-deck storage.

Off-vessel storage can include one or more auxiliary vessels 202 such as barges or rafts, storage containers located on land or on a stationary offshore platform, or any suitable storage containers located off of the vessel. The auxiliary vessel 202 may be substantially passive, with little to no on-board propulsion mechanisms. For example, the auxiliary vessel 202 can be a barge that must be towed by a tow-boat. Alternatively, the auxiliary vessel 202 can have on-board propulsion mechanisms. Alternatively, the off-vessel storage can be the environment, such as the seabed (e.g., as in the case of sediment transport). Off-vessel storage may be substantially passive, and may be coupled to and towed by the vessel. However, the off-vessel storage can be substantially stationary relative to the seabed or include propulsion devices, wherein the off-vessel storage is driven to move with the vessel 150. Off-vessel storage is used to store low bulk density reagents, such as aggregate 324. Off-vessel storage can be preferred when the low bulk density reagent is a significant proportion of the final product. The low bulk density reagent is a reagent that must be shipped to the production site, but can alternatively be a reagent that is locally supplied.

Figure 3B:
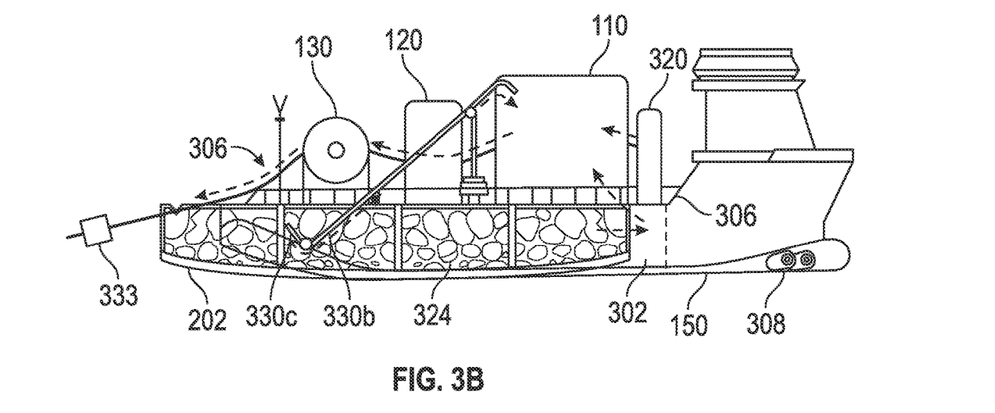

The reagent transporter 330 is substantially fluidly sealed along its length, but can alternatively be open. The reagent transporter 330a can be a conveyor belt, buckets, a screw auger, or any other suitable material transportation mechanism. As shown in FIGS. 3A and 3B, the reagent transporter 330a is operable between a stored configuration wherein the reagent transporter is collapsed or retracted 330a onto the vessel, and an extended configuration 330b wherein the reagent transporter is extended and fluidly connects to the off-vessel storage or a container on the off-vessel storage. As shown in FIG. 3B, the reagent transporter lid is in open configuration 330c and ready to draw the stored material.

In one example of the system, the product is ready-mix concrete. The components (reagents) of ready-mix concrete can include materials such as aggregate, cement, water, retardants, and accelerators. Admixtures can be stored in containers in the hull 302, cement can be stored in on-deck storage containers, and water can be stored in hull containers or be derived (e.g., pumped) from the surrounding water. Aggregate 324 is stored off-vessel, on an auxiliary vessel 202 but alternatively in any suitable off-vessel storage.

As shown in FIG. 3A, the displacement mechanism 120 of the system functions to provide a propulsion force that moves the product from the mixing volume 110 to the end site 350. The displacement mechanism 120 provides a force capable of pushing a viscous product through a length of the transfer mechanism 130. The displacement mechanism 120 provides 50-150 bar of pressure, but can alternatively provide more or less pressure. The displacement mechanism 120 applies a substantially constant pressure to the product egressing out of the mixing volume 110, but can alternatively apply a periodic pressure or any other suitable pressure to the product. The displacement mechanism 120 is robust enough to withstand the forces generated by moving the coarse granular material of the product. The displacement mechanism 120 may be additionally capable of running in reverse to pump a fluid into the vessel 150 (e.g., waste products into a storage container). Alternatively, the system can include a secondary displacement mechanism configured to pump fluids and/or solids onto the vessel 150. The displacement mechanism 120 may be a high-pressure pump, more a piston pump. However, the displacement mechanism 120 can be a screw pump, centrifugal pump, progressing cavity pump, triplex style plunger pump, impulse pump, or any other suitable pump. The displacement mechanism 120 can alternatively be an auger, chute, series of buckets, or any other suitable mechanism. The system includes a single displacement mechanism, but can alternatively include multiple displacement mechanisms (e.g., one per mixing volume, multiple per mixing volume, one per reagent, etc.).

The displacement mechanism 120 may be arranged in or connected to the fluid path between the reagent storage 112 and the transfer mechanism 130. More preferably, the displacement mechanism 120 may be arranged in series between the mixing volume 110 and the transfer mechanism 130. However, the displacement mechanism 120 can be arranged in parallel between the mixing volume 110 and the transfer mechanism 130, arranged between the reagent storage 112 and the transfer mechanism 130 in series or in parallel, or arranged in any suitable configuration. The displacement mechanism 120 may be controlled by the vessel control system, but can alternatively be controlled by a second control system, manually controlled, or otherwise controlled.

The transfer mechanism 130 of the system functions to transfer the product from the vessel 150 to the desired location. The transfer mechanism 130 may be fluidly sealed along its length, but can alternatively be substantially open to the ambient environment along its length. The transfer mechanism 130 includes a low-friction interior, such as a coating or bonded layer, but can alternatively include any suitable interior. The transfer mechanism 130 may be flexible, but can alternatively be rigid. The transfer mechanism 130 may be slightly elastic (e.g., more elastic than steel but less elastic than rubber) to support sudden cross sectional area changes due to collected aggregate in the product stream, but can alternatively be substantially rigid. The system includes a single transfer mechanism, but can alternatively include multiple (e.g., one per mixing volume, multiple for each mixing volume, etc.).

The transfer mechanism 130 may be fed by a single line 330 from the mixing volume 110, but can alternatively be fed by multiple lines. In an alternative variation of the system, multiple feeder lines, each extending from a respective reagent storage container of a constituent reagent, can feed the transfer mechanism 130. The multiple feeder lines extend through a length of the transfer mechanism 130. The multiple feeder lines keep the reagents fluidly isolated until the multiple lines meet in a single mixing line. The single mixing line is arranged distal the vessel when the transfer mechanism is in the extended mode. The single mixing line includes one or more agitators (e.g., blade, rotating sections, etc.) that mix or react the constituent reagents. This system variation can enable long-distance product supply, as the reagents are not reacted into the product until the reagents are proximal the desired site.

The transfer mechanism 130 may be configured to float on the surface of the water, and can include flotation devices 333 along its length or along given sections. The flotation devices 333 are removably coupled to the transfer mechanism 130, but can alternatively be permanently coupled or built in to the transfer mechanism 130. Alternatively, the transfer mechanism 130 can be configured to hang under water, wherein the distal end or section proximal the distal end includes a flotation device 333. The transfer mechanism 130 can additionally include surface indicators, such as lights or buoys. The transfer mechanism 130 hangs under its own weight, but can alternatively include weights that sink the transfer mechanism to a desired depth. In one variation, the transfer mechanism 130 may be configured to sink low enough into the water to leverage the deepwater temperature (lower temperature) to extend the concrete curing time.

The transfer mechanism 130 may be operable between an extended mode and a stored mode. In the extended mode, at least a section of the transfer mechanism may be extended beyond the boundaries of the vessel 150. In the stored mode, the transfer mechanism 130 may be wholly or mainly contained within the boundaries of the vessel. The transfer mechanism 130 can be wound about a spool, retracted, or otherwise stored in a compacted state in the stored mode. The transfer mechanism 130 may be manually switched between the stored and extended mode, but can alternatively be automatically switched. In one variation of the system, a vessel 150 attaches to an end of the transfer mechanism distal the displacement mechanism 336 (distal end) and extends the transfer mechanism to the desired location. In another variation, the vessel 150 may be brought proximal the desired site, the distal end 336 of the transfer mechanism 130 attached to the desired site, and the vessel moved away from the desired site, to deeper or less trafficked waters. The transfer mechanism 130 can be retracted by winding a spool, applying a retraction force to the distal end 336, or otherwise retracted. In another variation, the transfer mechanism 130 may be automatically extended and retracted by an arm or guide. However, the transfer mechanism 130 can be switched between the extended and retracted modes in any suitable manner.

The transfer mechanism 130 may be a pipe. Also, the transfer mechanism 130 may be two or more interconnected lengths of the same type of pipe. Additionally, the transfer mechanism 130 may include sections of different types of fluid lines, such as pipes, hoses, and tubing. For instance, a rubber hose (not shown) that is more flexible and easy to handle by humans may be attached to an end of a composite spoolable pipe. The transfer mechanism may alternatively be an auger, conveyor belt, series of buckets, or any other suitable mechanism capable of transporting fluid. The pipe may be flexible and capable of being stored on a spool, but can alternatively be rigid and formed from telescoping or collapsing parts. The pipe is a composite bonded pipe, such as the oil and gas downline sold by Airborne™, SHAWCOR, or other comparable product, but can alternatively be a series of rigid sections hinged together, a reinforced rubber pipe, or any other suitable pipe. The pipe may be formed of multiple layers, which may be bonded or unbounded. The pipe may be formed of metals, composites, non-metals, carbon fiber, and/or other materials.

FIG. 3B shows the transfer of stored material between the off-shore preparation system compartments as dashed arrows. The reagent, aggregate and other additives flow from their storage area to the mixing volume 110. It is possible that the ingredients are moved to a different compartment in the vessel 150 before they are poured into the mixing volume 110. The mixing volume 110 becomes ready-mix, which is transferred to the transfer mechanism 130 through the pump 120.

Figure 4:
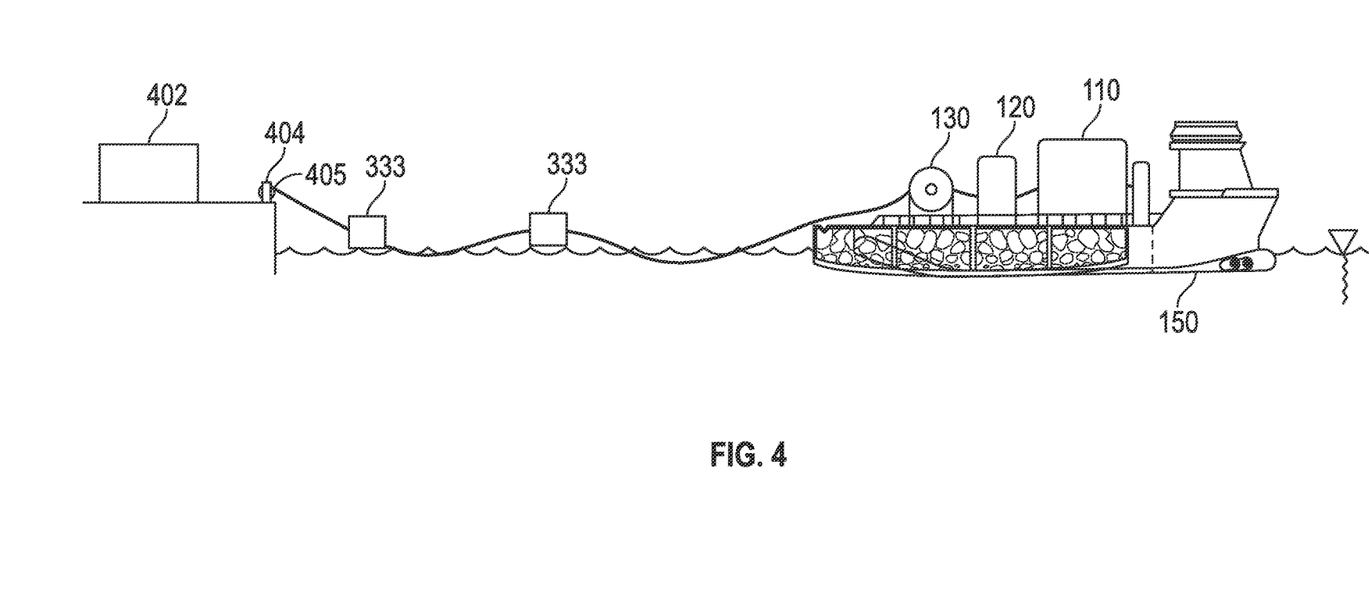
FIG. 4 is a variation of off-shore product delivery system to a pour site.

As shown in FIG. 4, the transfer mechanism 130 is extended to a target location 404 that is proximate to a pour site 402. The transfer mechanism 130 acts as a conduit through which the ready-mix flows to the target location 404. The direction of flow is shown as dashed line in FIG. 3B. The target location 404 may be on land or on water (e.g., a docked vessel). The transfer mechanism 130, which may be spoolable pipe, has an outlet end 405 that may be guided to the target location 404 using an airborne craft, a watercraft, a tether, or other suitable guidance device. For example, the guidance device may physically connect to the outlet end 405 of the transfer mechanism 130. In one embodiment, the outlet end 405 may have appropriate fittings (not shown) to connect with a fluid conduit that leads to the pour site 402. In other embodiments, the ready-mix concrete may flow out of the outlet end 405 into containers or vehicles.

As one skilled in the art will understand, the proximity of the pour site 402 from the target location 404 depends on the time it takes for the ready-mix to set. Thus, the distance between the pour site 402 and the target location 404 may be as little as a few hundred feet or as far as 1 to 2 miles. The extended pipe from the transfer mechanism 130 runs generally parallel to the water's surface and can be totally submersed, partially submersed, or fully floating in water by the floatation devices 333. The vessel 150 may be underway and not be anchored or moored.

Figure 5:
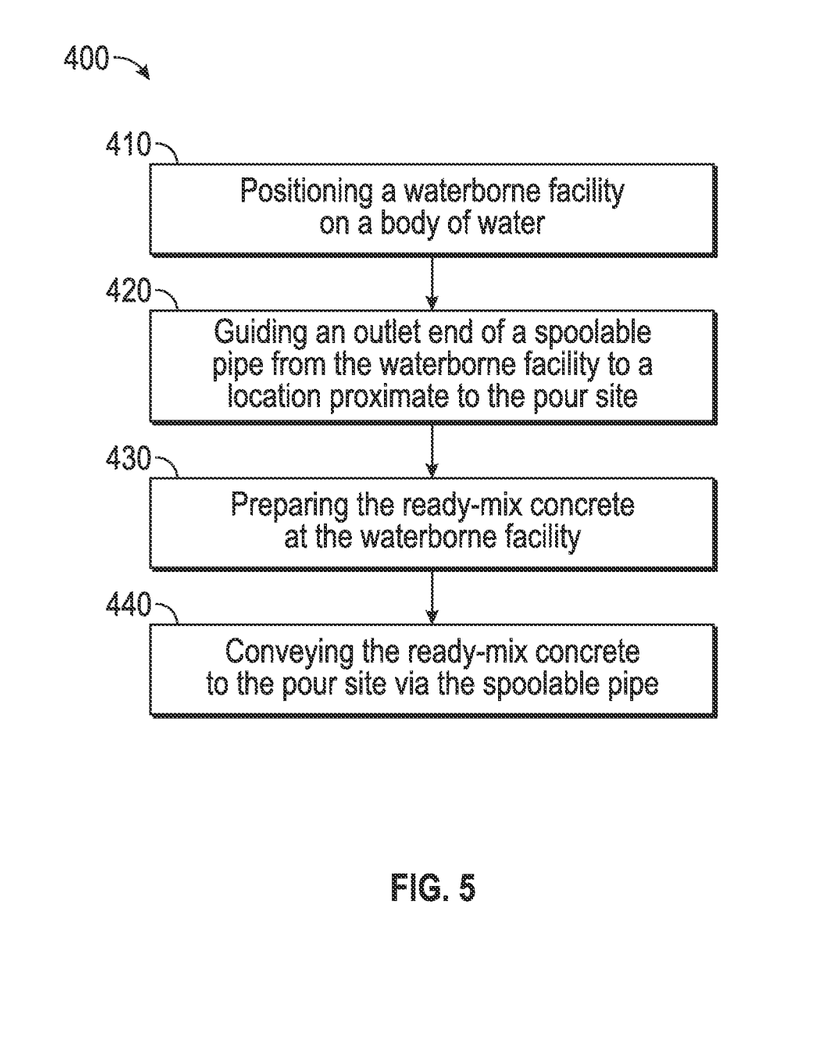
FIG. 5 is a flow-chart depicting a method for delivering a ready-mix concrete to a pour site.

Referring now to FIG. 5, there is shown a flow chart illustrating a method 400 for delivering a ready-mix concrete to a pour site. As used throughout, the term "ready-mix" concrete refers to concrete that is specifically manufactured for delivery to the pour site in a freshly mixed and plastic or unhardened state. Ready-mix concrete may include components such as cement, water and aggregates comprising sand and gravel or crushed stone. The aggregate may make up at least 50% of a total volume of the ready-mix concrete. In aspects, the volume may be 60-75%.

The method may include the step 410 of positioning a waterborne facility on a body of water. The waterborne facility may include a spoolable pipe wound on a spool. The method may include the step 420 of guiding an outlet end of a spoolable pipe from the waterborne facility to a location proximate to the pour site, the step 430 of preparing the ready-mix concrete at the waterborne facility, and the step 440 of conveying the ready-mix concrete to the pour site via the spoolable pipe. It should be noted that the sequence of some of these steps may be varied to accommodate site specific conditions.

In variants, the method may include transporting at least one component of the read-mix concrete to the waterborne facility using a watercraft. Moreover, the method may include docking the watercraft carrying the at least one component at a side of the waterborne facility, rotating the transporter toward the side of the waterborne facility, and positioning an inlet of the transporter in contact with the at least one component.

In variants, the waterborne facility may not be attached to a submerged land mass. By submerged land mass, it is meant the ocean floor, sea bed, or other surface defining the boundary between the water and the earth below. By attached, it is meant that there are no connections between the waterborne facility and the subsea land mass. Thus, there are no risers, anchors, legs, columns, or other structures that connect the waterborne facility to the subsea land mass. In such variants, the method may include dynamically positioning the waterborne facility using a propulsion system associated with the waterborne facility while conveying the ready-mix concrete to the pour site via the spoolable pipe.

In variants, the method may also include displacing the spoolable pipe by pulling the outlet end of the pipe using a suitable vehicle or device and/or rotating the spool on which the spoolable pipe is wound. The spool may be hydraulically actuated using on-board power.

From the above, it should be appreciated that what has been described includes a system for delivering a ready-mix concrete to a pour site. The system may include a waterborne facility positioned in a body of water, a ready-mix concrete preparation system located on the waterborne facility, and a spoolable pipe wound on a spool on the waterborne facility and connected to the ready-mix concrete preparation system.

In some embodiments, the ready-mix concrete preparation system may include a mixing volume and a pump in fluid communication with the mixing volume. The pump pumps the ready-mix concrete from the mixing volume into the spoolable pipe. Also, the system may include one or more transporters that convey at least one component of the ready-mix into the mixing volume. The transporter(s) may receive the component(s) from a storage tank on the waterborne facility and/or an adjacent watercraft. The transporter may be configured to convey the component(s) into the mixing volume. Depending on the particular application, the waterborne facility may a self-powered watercraft, an unpowered watercraft, a towed watercraft, a floating offshore platform, and an offshore platform supported by a seabed.

It should be understood that the teachings of the present disclosure are not limited to only ready-mix concrete preparation system. For example, the present disclosure provides methods of delivering any flowable material to a selected site, which may be a land surface, underground, on a water surface, or underwater. One illustrative method may include positioning a waterborne facility on a body of water, guiding an end of a primary spoolable pipe from the waterborne facility to a location proximate to the selected site, and discharging the flowable material through the primary spoolable pipe using a pump. The primary spoolable pipe may be guided along a water's surface.

In applications suitable for dredging operations, the method may include unspooling a second spoolable pipe disposed on the waterborne facility, positioning an inlet of the second spoolable pipe at a dredging location at a seabed, receiving sediments from the seabed through the second spoolable pipe, and pumping the sediments from the second spoolable pipe to the primary spoolable pipe.

In applications suitable for firefighting, the method may include drawing seawater from a location proximate to the waterborne facility, the seawater being the flowable material. In applications suitable for supporting construction activities, the flowable material may be a grout, cement, cement slurry, additive, chemical agent, or any other fluid, slurry, gel, plasma, etc. Cement slurry contrasts from ready mix concrete in that cement slurry is primarily a filler or sealing material used in applications such as structural fill under buildings, anticorrosion fills, thermal fills and durable pavement bases. Unlike the ready mix concrete, the cement slurry has generally a lower compressive strength, that is, the cement slurry does not provide as much structural integrity to support loadings. Other flowable materials include controlled low-strength material (CLSM), which is a self-compacted, cementitious material. CLSM includes materials such as flowable mortar, plastic soil-cement, and soil-cement slurry. Generally speaking, CLSM includes materials having a compressive strength of 1,200 pounds per square inch (psi) or less.

As a person skilled in the art will recognize from the previous detailed description and from the figures and claims, modifications and changes can be made to the preferred embodiments of the invention without departing from the scope of this invention defined in the following claims.

I claim:

1. A method of delivering a ready-mix concrete composed of a plurality of components to a target location for a pour site, comprising:
    positioning a waterborne facility on a body of water, wherein the waterborne facility includes a spoolable pipe wound on a spool, the spoolable pipe being formed primarily of a non-metal and including a plurality of bonded layers;
    guiding an outlet end of the spoolable pipe from the waterborne facility to the target location, wherein the spoolable pipe is generally parallel to a water's surface, wherein a portion of the spoolable pipe between the spool and the outlet end is at least partially submerged in the body of water and the outlet end is above the body of water;
    floating a section of the spoolable pipe along the surface of the water;
    using at least one flotation device to float the section of the spoolable pipe along the surface of the water;
    transporting the plurality of components in an unmixed state to the waterborne facility;
    preparing the ready-mix concrete at the waterborne facility by mixing the plurality of components in a mixing volume at the waterborne facility;
    pumping the ready-mix concrete into the spoolable pipe using a pump that operates at at least 50 bars, wherein the pump is positioned on the waterborne facility; and
    conveying the ready-mix concrete to the target location via the spoolable pipe.

2. The method of claim 1, wherein the ready-mix concrete is formed using a plurality of components at least one of which is selected from one of: gravel and crushed stone, and further comprising:
    storing water inside a hull of the waterborne facility; and
    storing at least one of the plurality of components in a compartment inside a hull of the waterborne facility.

3. The method of claim 1, wherein the ready-mix concrete is formed using at least an aggregate and a cement, and wherein the aggregate makes up at least 50% of a total volume of the ready-mix concrete.

4. The method of claim 1, further comprising:
    transporting at least one component of the plurality of components to the waterborne facility using a watercraft.

5. The method of claim 1, further comprising dynamically positioning the waterborne facility to maintain a selected geographical position of the waterborne facility by using a propulsion system and sensors associated with the waterborne facility, the dynamic positioning being done while conveying the ready-mix concrete to the pour site via the spoolable pipe.

6. The method of claim 1, further comprising displacing the spoolable pipe by one of: (i) pulling the outlet end of the pipe, and (ii) rotating the spool on which the spoolable pipe is wound.

7. The method of claim 1, wherein the mixing is done using a shaft mixer.

8. The method of claim 1, wherein the mixing is done using a non-rotary drum mixer.

9. The method of claim 7, wherein the mixing is done using an agitation device selected from one of: a two-shaft mixer, a vertical axis mixer, and an agitation device having translating surfaces.

10. A method of delivering a ready-mix concrete composed of a plurality of components to a target location, the plurality of components including at least aggregate and cement, comprising:
    positioning a waterborne facility on a body of water, wherein the waterborne facility includes a non-rubber spoolable pipe wound on a spool, the spoolable pipe including a plurality of bonded layers;
    guiding an outlet end of a spoolable pipe from the waterborne facility to the target location, wherein the spoolable pipe is generally parallel to a water's surface, wherein a portion of the spoolable pipe between the spool and the outlet end is at least partially submerged in the body of water and the outlet end is above the body of water;

floating a section of the spoolable pipe along the surface of the water;

using at least one flotation device to float the section of the spoolable pipe along the surface of the water;

transporting the plurality of components in an unmixed state to the waterborne facility;

storing the cement in a compartment on the waterborne facility, the compartment being inside a hull of the waterborne facility;

conveying the cement from the compartment to a mixing volume;

preparing the ready-mix concrete at the waterborne facility by mixing the plurality of components in the mixing volume at the waterborne facility; and conveying the ready-mix concrete to the target location via the spoolable pipe using a pump positioned on the waterborne facility.

11. The method of claim 10, wherein the waterborne facility is one of: (i) a self-powered watercraft, (ii), an unpowered watercraft, (iii) a towed watercraft, (iv) a floating offshore platform, and (v) an offshore platform supported by a seabed.

12. The method of claim 10, further comprising dynamically positioning the waterborne facility to maintain a selected geographical position of the waterborne facility by using a propulsion system and sensors associated with the waterborne facility, the dynamic positioning being done while conveying the ready-mix concrete to the pour site via the spoolable pipe.

13. The method of claim 10, wherein the mixing is done using an agitation device selected from one of: a two-shaft mixer, a vertical axis mixer, and an agitation device having translating surfaces.

14. The method of claim 10, storing the aggregate on a deck of the waterborne facility and conveying the aggregate from the deck to a mixing volume.

* * * * *